3,413,335
ALKYL SUCCINATE ESTER PROCESS
Seymour J. Lapporte, Berkeley, Calif., assignor to Chevron Research Company, a corporation of Delaware
No Drawing. Filed Dec. 28, 1964, Ser. No. 421,698
16 Claims. (Cl. 260—485)

ABSTRACT OF THE DISCLOSURE

Butenedioate esters are alkylated by heating a mixture of the ester and a substituted acetaldehyde to a temperature in the range 200–350° C. in a decarbonylative reaction in which carbon monoxide is eliminated from the aldehyde, thereby producing the corresponding substituted succinate ester. Free radicals catalyze the reaction.

---

This invention relates to a novel method for the preparation of alkyl succinate esters by the alkylation of butenedioate esters. More particularly, it relates to a novel decarbonylative alkylation of the foregoing esters at moderately elevated temperatures using isobutyraldehyde and isobutyraldehyde-like aldehydes.

It has now been found that alkyl-substituted succinic acid esters can be prepared by heating butenedioate esters of monohydric nonolefinic hydrocarbanols at reaction temperatures in the range from about 200–350° C. in the presence of alkyl-substituted acetaldehydes having at least two such substituent groups. Many substituted acetaldehydes are useful alkylation agents, and the range of suitable alkyl substituents goes from methyl up to alkyl groups having at least 21 carbon atoms per group. The more practical ester hydrocarbyl groups from the standpoint of availability include all $C_1$–$C_{20}$ primary and secondary straight-chain alkyl groups.

In accordance with the subject invention, a substituted acetaldehyde is mixed with a suitable alkyl butenedioate ester and the mixture is maintained at about 275° C. After about a 5–10 minute reaction period, sufficient conversion of reactants occurs in general to yield an appreciable amount of the desired alkyl-substituted succinic acid ester. The degree of conversion may be followed by measuring the evolved carbon monoxide. Product work-up and recovery is made by conventional means including distillation, fractional crystallization, and the like.

At about 200° C. there is a slow but appreciable rate of reaction during the course of the heating. On the other hand, at temperatures as high as 350° C. and higher, the reaction rate is relatively fast but losses due to thermal degradation can be substantial. The preferred reaction temperature range is from about 240 to 300° C.

The subject reaction may be carried out in the presence of an inert diluent or in the absence of diluents, that is neat. Preferably, the reaction is effected in the absence of diluents in the liquid phase having present at least about a 1:1 mol ratio of the ester and aldehyde reactants. Preferably, an excess of the aldehyde over the ester is employed and as much as a 10:1 mol ratio excess can be conveniently used. As a practical matter, no particular advantage is obtained by using larger relative amounts.

The aldehydes useful in the instant process are, in general, di- and trialkyl-substituted acetaldehydes. These alkyl groups may also be inertly substituted, that is by phenyl, chloride, and the like substituent groups which are substantially unaffected by temperatures in the range of the subject process. The preferred aldehyde compounds are characterized by the general formula:

in which the R group of the formula is a group containing less than 13 carbon atoms.

Butenedioate esters of monohydric nonolefinic hydrocarbanols in general are alkylatable in the instant process. By definition, the prefix hydrocarb is meant a radical composed of carbon and hydrogen and by a monohydric hydrocarbanol is meant a hydrocarbon having a single hydrogen atom replaced by a hydroxyl group. Esters having hydrocarbyl ester groups having less than 35 carbon atoms per group are preferred. For practical reasons, the methyl esters, being substantially less costly than any other of the subject esters are preferred.

The alkylatable esters contemplated are characterizable by the general formula:

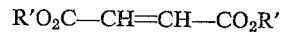

wherein the R' groups are nonolefinic hydrocarbyl groups having less than 35 carbon atoms per group.

Inertly substituted butenedioic acid esters may also be employed in the present process. Thus, one of the hydrogen atoms bound to ethylenic carbon of the acid may be substituted by an alkyl group which does not sterically hinder the desired reaction such as an alkyl group bearing no branching substitution closer than the second carbon atom away from the bonding carbon atom of the alkyl group. The substituent group should not be too bulky and, therefore, should contain less than about 7 carbon atoms.

Representative substituted acetaldehydes useful as alkylation agents in the process are 2-methylpropanal, 2-methylbutanal, 2-ethylpropanal, 2-n-propylhexanal, 2-decyldecanal, 2-methyloctadecanal, pivaldehyde, 2,2-dimethylhexanal, 2,2-di-n-propylpentanal, 2-(2-phenylethyl)-propanal, 2-(2-cyclohexylethyl)-butanal, 2-(3-cyclododecylpropyl)-heptanal, 2-(2-chloroethyl)-propanal, 2,2-dimethyl-3-chloropropanal, and the like aldehydes.

Representative butenedioate esters include dimethyl maleate, dimethyl fumarate, methyl-ethyl maleate, didecyl maleate, di-2-ethylhexyl maleate, di-n-butyl fumarate, diethyl ethyl-maleate, dimethyl (3-methyl-butyl)-maleate dimethyl (3-chlorobutyl)-maleate, diphenyl maleate, and the like esters.

The following examples are illustrative of various aspects of the subject invention. Variations can be made, of course, and should be understood to be within the scope of the invention in view of the above disclosure and succeeding comments and claims.

Examples 1–8

A series of experiments was run in a steel autoclave. The pressure vessel was used in order to maintain the required liquid reaction phase. Using the reaction conditions listed as well as the charges also indicated, the results found were as follows:

TABLE.— REACTION OF ALDEHYDES WITH DIMETHYL MALEATE

| Run | Aldehyde | Temp., °C. | Moles RCHO | Moles maleate | Time, hours | Moles CO | Moles RCHO converted | Conversion of maleate, percent | Yield of dimethyl alkylsuccinate |
|---|---|---|---|---|---|---|---|---|---|
| 1 | Isobutyraldehyde | 200 | 0.5 | 0.3 | 16 | 0.024 | 0.110 | <5 | 25 |
| 2 | do | 250 | 0.5 | 0.3 | 15.4 | 0.195 | 0.200 | 84 | 60 |
| 3 | do | 250 | 0.5 | 0.3 | 17 | 0.164 | 0.176 | 86 | 46 |
| 4 | do [1] | 250 | 0.5 | 0.3 | 1.9 | 0.153 | 0.163 | 63 | 69 |
| 5 | do [2] | 250 | 0.5 | 0.3 | 16.5 | 0.137 | 0.200 | 88 | 40 |
| 6 | n-Butyraldehyde [2] | 250 | 0.5 | 0.3 | 17.6 | [3] 0.020 | 0.365 | >87 | [4] <10 |
| 7 | Benzaldehyde [2] | 250 | 0.3 | 0.3 | 15.5 | [5] 0.002 | | | |
| 8 | Phenyl acetaldehyde | 195 | 0.08 | 0.08 | 5.2 | 0.002 | 0.058 | <13 | 0 |

[1] 0.01 mole 2,5-dimethyl-2,5-dehydroperoxyhexane added.
[2] 0.001 mole chloranil added.
[3] 0.077 mole carbon dioxide also formed.
[4] Based on distillation boiling point. Major products were aldehyde condensation products and telomers containing several maleate units.
[5] 0.055 mole carbon dioxide also formed.

These data demonstrate many aspects of the invention including:

(1) Substituted acetaldehydes bearing at least two alkyl substituent groups are useful alkylation agents for butenedioate esters.

(2) Free radical catalysts are effective for accelerating the decarbonylative alkylation and improving yields.

(3) Use of reaction temperatures below about 200° C. are unsatisfactory.

(4) The elevated temperatures required for these decarbonylative alkylations appear to neutralize conventional free radical reaction inhibitors such as chloranil.

In view of the foregoing examples, free radical type catalysts known in the art to be useful at elevated temperatures are shown to be useful in the process. These include radiant energy, ultraviolet light, gamma rays and the like, as well as azo- and peroxidic compounds (cf. "Organic Peroxides," A. V. Tobolsky and R. B. Mesrobian, Library of Congress Cat. Card No. 54–7234).

The above data also shows that the reaction mechanism is of the free radical type. Therefore since it is well established that three alkyl substituent groups better stabilize radical intermediates, trialkyl substituted acetaldehydes are at least as good alkylation agents as the dialkyl substituted counterparts demonstrated by the use of isobutyraldehyde above.

I claim:

1. Process for the alkylation of a butenedioate ester which comprises reacting an ester of the formula $$RO_2C—CH=CH—CO_2R$$

wherein said R radicals are selected form the group consisting of non-olefinic hydrocarbyl groups containing less than 35 carbon atoms, with an aldehyde of the formula $$(R')_3CCHO$$

wherein said R' radicals are selected from the group consisting of hydrogen, and alkyl groups containing less than 13 carbon atoms and wherein not more than one of said R' is hydrogen, by heating said reactants in the liquid phase at a temperature in the range from about 200 to 350° C., thereby producing the corresponding succinate ester of the formula $$RO_2CCH[C(R')_3]CH_2CO_2R$$

2. The process as in claim 1 wherein said reaction temperature is in the range 240° C. to 300° C.

3. The process as in claim 1 wherein said R is methyl.

4. Process for the production of $$CH_3O_2CCH[CH(CH_3)_2]CH_2CO_2CH_3$$

which comprises reacting dimethyl maleate with isobutyraldehyde by heating said reactants in the liquid phase at a temperature in the range from about 200–350° C., thereby producing said succinate ester.

5. Process for the alkylation of a butenedioate ester of the formula $$RO_2C—CH=CH—CO_2R$$

wherein said R radicals are selected from the group consisting of non-olefinic hydrocarbyl groups containing less than 35 carbon atoms, which comprises heating a mixture of said ester and an aldehyde of the formula $$(R')_2HCCHO$$

wherein said R' radicals are selected from the group consisting of alkyl groups containing less than 13 carbon atoms, in the liquid phase to a temperature in the range from about 200° C. to 350° C., thereby producing the corresponding succinate ester of the formula $$RO_2CCH[CH(R')_2]CH_2CO_2R$$

6. The process of claim 5 wherein said reaction is catalyzed by a free radical catalyst selected from the group consisting of azo- and peroxidic compounds.

7. The process of claim 5 wherein said temperature is in the range from about 240° C. to 300° C. and wherein for each mol of said ester there is an excess of said aldehyde of from about 1–10 mols.

8. Process for the production of a substituted ester of the formula $H_3CO_2CCH[CH(CH_3)_2]CH_2CO_2CH_3$ which comprises reacting a mixture of isobutyraldehyde, dimethyl maleate and 2,5-dimethyl-2,5-dehydroperoxyhexane, said mixture being in about the relative mol ratio of 1.7:1:0.033, respectively, said reaction being effected in the liquid phase by heating said reactants at a temperature of about 250° C., thereby producing said ester.

9. Process for the alkylation of a butenedioate ester which comprises reacting an ester of the formula $$RO_2C—CH=CH—CO_2R$$

wherein said R radicals are selected from the group consisting of non-olefinic hydrocarbyl groups containing less than 35 carbon atoms, with an aldehyde of the formula $$(R')_3CCHO$$

wherein said R' radicals are selected from the group consisting of hydrogen, and alkyl groups containing less than 13 carbon atoms and wherein not more than one of said R' is hydrogen, by heating said reactants in the liquid phase at a temperature in the range from about 200 to 350° C., and wherein said reaction is catalyzed by a free radical catalyst selected from the group consisting of azo- and peroxidic compounds, thereby producing the corresponding succinate ester of the formula $$RO_2CCH[C(R')_3]CH_2CO_2R$$

10. Process for the alkylation of a butenedioate ester which comprises reacting an ester of the formula $$RO_2C—CH=CH—CO_2R$$

wherein said R radicals are selected from the group consisting of non-olefinic hydrocarbyl groups containing less than 35 carbon atoms, with an aldehyde of the formula $$(R')_3CCHO$$

wherein said R' radicals are selected from the group consisting of hydrogen, and alkyl groups containing less than 13 carbon atoms and wherein not more than one of said R' is hydrogen, by heating said reactants in the liquid phase at a temperature in the range from about 200 to 350° C., and wherein said reaction is catalyzed by a radiant energy free radical catalysis means selected from the group consisting of ultraviolet light and gamma rays, thereby producing the corresponding succinate ester of the formula $$RO_2CCH[C(R')_3]CH_2CO_2R$$

11. Process for the alkylation of a butenedioate ester which comprises reacting an ester of the formula $$RO_2C\text{---}CH\text{=}CH\text{---}CO_2R$$

wherein said R radicals are selected from the group consisting of non-olefinic hydrocarbyl groups containing less than 35 carbon atoms, with an aldehyde of the formula $$(R')_3CCHO$$

wherein said R' radicals are selected from the group consisting of hydrogen, and alkyl groups containing less than 13 carbon atoms, wherein not more than one of said R' is hydrogen, and wherein one hydrogen atom of said alkyl radical R' is replaced by a chloride group, said reaction being effected by heating said reactants in the liquid phase at a temperature in the range from about 200 to 350° C., thereby producing the corresponding succinate ester of the formula $$RO_2CCH[C(R')_3]CH_2CO_2R$$

12. Process for the alkylation of a butenedioate ester which comprises reacting an ester of the formula $$RO_2C\text{---}CH\text{=}CH\text{---}CO_2R$$

wherein said R radicals are selected from the group consisting of non-olefinic hydrocarbyl groups containing less than 35 carbon atoms, with an aldehyde of the formula $$(R')_3CCHO$$

wherein said R' radicals are selected from the group consisting of hydrogen, and alkyl groups containing less than 13 carbon atoms, wherein not more than one of said R' is hydrogen, and wherein one hydrogen atom of said alkyl radical R' is replaced by a chloride group, said reaction being effected by heating said reactants in the liquid phase at a temperature in the range from about 200 to 350° C. in the presence of a free radical catalyst selected from the group consisting of azo- and peroxidic compounds, thereby producing the corresponding succinate ester of the formula $$RO_2CCH[C(R')_3]CH_2CO_2R$$

13. Process for the alkylation of a butenedioate ester which comprises reacting an ester of the formula $$RO_2C\text{---}CH\text{=}CH\text{---}CO_2R$$

wherein said R' radicals are selected from the group consisting of non-olefinic hydrocarbyl groups containing less than 35 carbon atoms, with an aldehyde of the formula $$(R')_3CCHO$$

wherein sadi R' radicals are selected from the group consisting of hydrogen, and alkyl groups containing less than 13 carbon atoms, wherein not more than one of said R' is hydrogen, and wherein one hydrogen atom of said alkyl radical R' is replaced by a chloride group, said reaction being effected by heating said reactants in the liquid phase at a temperature in the range from about 200 to 350° C. in the presence of a radiant energy free radical catalysis means selected from the group consisting of ultraviolet light and gamma rays, thereby producing the corresponding succinate ester of the formula $$RO_2CCH[C(R')_3]CH_2CO_2R$$

14. Process for the alkylation of a butenedioate ester which comprises reacting an ester of the formula $$RO_2C\text{---}CR''\text{=}CH\text{---}CO_2R$$

wherein said R radicals are selected from the group consisting of non-olefinic hydrocarbyl groups containing less than 35 carbon atoms, and wherein said R'' is a radical selected from the group consisting of alkyl groups containing less than 7 carbon atoms and free of branching on the first and second carbon atoms of said group, with an aldehyde of the formula $$(R')_3CCHO$$

wherein said R' radicals are selected from the group consisting of hydrogen, and alkyl groups containing less than 13 carbon atoms and wherein not more than one of said R' is hydrogen, by heating said reactants in the liquid phase at a temperature in the range from about 200 to 350° C., thereby producing the corresponding succinate ester.

15. Process for the production of $$CH_3O_2CCH[CH(CH_3)_2]CH_2CO_2CH_3$$

which comprises reacting dimethyl maleate with isobutyraldehyde by heating said reactants in the liquid phase at a temperature in the range from about 200–350° C. and wherein said reaction is catalyzed by a free radical catalyst selected from the group consisting of azo- and peroxidic compounds, thereby producing said succinate ester.

16. Process for the production of $$CH_3O_2CCH[CH(CH_3)_2]CH_2CO_2CH_3$$

which comprises reacting dimethyl maleate with isobutyraldehyde by heating said reactants in the liquid phase at a temperature in the range from about 200–350° C. and wherein said reaction is catalyzed by a radiant energy free radical catalyst means selected from the group consisting of ultraviolet light and gamma rays, thereby producing said succinate ester.

References Cited

UNITED STATES PATENTS 2,577,133   12/1951   Ladd _____ 260—483

LORRAINE A. WEINBERGER, *Primary Examiner.*

T. L. GALLOWAY, *Assistant Examiner.*